United States Patent Office 3,432,522
Patented Mar. 11, 1969

3,432,522
PYRROLE-2-CARBOXAMIDO ALKYLENE AMIDINES
Nicole Marie Preau, Sevres, France, assignor to Rhone-Poulenc S.A., Paris, France, a French body corporate
No Drawing. Filed Mar. 30, 1964, Ser. No. 355,901
Claims priority, application France, Apr. 4, 1963, 930,453; Oct. 18, 1963, 951,101; Feb. 24, 1964, 964,894
U.S. Cl. 260—326.3         5 Claims
Int. Cl. C07d 27/26

This invention relates to amidines, their preparation and pharmaceutical compositions containing the same.

The present invention provides, as new compounds, the amidines of the general formula:

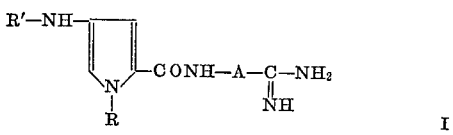

and their acid addition salts, wherein A represents a straight or branched alkylene group containing 1 to 5 carbon atoms, R represents a lower alkyl group and R' represents carbamoyl, mono(lower alkyl)carbamoyl, di(lower alkyl)carbamoyl, alkoxycarbonyl, aralkyloxycarbonyl, or carboxylic acyl. The term "lower alkyl" as used herein refers to alkyl of up to 4 carbon atoms. Similarly by "lower" alkanols and lower aliphatic carboxylic acids are meant alkanols and aliphatic carboxylic acids of up to 6 carbon atoms. The term "carboxylic acyl" refers to any acid group derived from an aliphatic, aromatic, araliphatic or heterocyclic carboxylic acid.

The compounds of Formula I and their acid addition salts possess interesting chemotherapeutic properties and are active as trypanocides, e.g. against *T. congolense* in cattle.

Preferred compounds of Formula I are those in which R' is lower aliphatic carboxylic acyl, such a group substituted by an amidino group, benzyloxycarbonyl, benzoyl, nicotimoyl, isonicotinoyl, or picolinoyl. Other preferred compounds are those in which R' is a group of formula: Z—X—CO— where X is

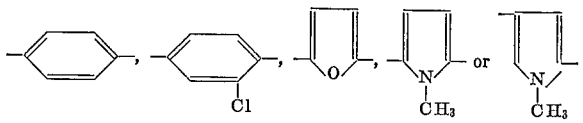

and Z is nitro, amino, formamido, acetamido, ureido, amidino, guanidino, amidinoacetamido, guanidinoacetamido, 3-guanidinopropionamido, or 4-guanidinobutyramido. A is preferably methylene, ethylene, or trimethylene. An especially valuable group of compounds are those in which A is ethylene, R is methyl, and R' is a group of formula: Z—X—CO— where X is p-phenylene, and Z is amidinoacetamido or guanidinoacetamido.

According to a feature of the invention, the compounds of general Formula I are prepared by converting the cyano group in a compound of the formula:

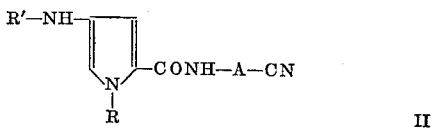

where A, R and R' are as hereinbefore defined, into an amidino group.

To effect this conversion, it is particularly advantageous to react a compound of general Formula II with hydrogen chloride in the presence of a lower alkanol and then to react the imino-ether hydrochloride obtained of the formula:

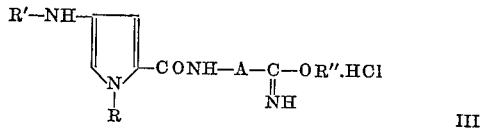

wherein R" is a lower alkyl group and A, R, and R' are as hereinbefore defined, with ammonia. The hydrochloride of a compound of general Formula I is obtained. The preparation of the imino-ether hydrochlorides of Formula III is best effected with anhydrous reagents, utilising the said lower alkanol as reaction medium, the temperature being kept at about 0° C.

The reaction of the imino-ether hydrochloride with ammonia is preferably also effected in an anhydrous medium. Suitable solvents are lower alkanols, such as ethanol, or compounds which do not contain free hydroxyl groups, such as diethyl ether and dioxane.

It is particularly advantageous to effect the reaction at about ambient temperature and in the presence of an excess of ammonia.

According to a further feature of the invention, the compounds of Formula I are prepared by acylating a compound of the formula:

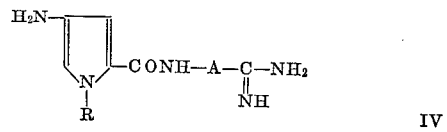

wherein A and R are as hereinbefore defined, so as to introduce an acyl group on the 4-position amino group. Preferably, the acylation is carried out using a halide, an ester or the anhydride of the appropriate acid. The reaction conditions depend upon the reagent used. Generally, the reaction is effected in an inert organic solvent such as an aromatic hydrocarbon or in water, the reaction mixture being kept near or below ambient temperature. It is particularly advantageous to utilise an acid-binding agent when an acid halide is used as acylating agent. Preferably, an excess of the amine of general Formula IV, of an organic base such as triethylamine, or of an inorganic base such as sodium bicarbonate, is used as acid-binding agent.

The invention also comprises the conversion of a compound of general Formula I into another compound of the same general formula by converting a substituent R' into another substituent R' by the application of known methods. Thus, for example, when R' represents an acyl group containing a nitro group, the latter group may be converted into an amino group by the classic methods for the reduction of nitro compounds to amines, and in particular by catalytic hydrogenation, using a Raney nickel or Adams platinum catalyst. Any amino group in R' may similarly be converted into another functional group. Thus, reaction with the hydrochloride of quanidinoacetic acid in the presence of dicyclohexylcarbodiimide converts an amino group into quanidinoacetamido group. Reaction with cyanate, e.g., potassium cyanate, converts an amino group into a ureido group, and reaction with cyanamide gives a quanidino group.

The addition salts of the compounds of the invention may be converted by known methods into the corresponding bases, taking the usual precautions for the isolation of aliphatic amidines, or into other acid addition salts.

As examples of addition salts there may be mentioned, in addition to the hydrochlorides, salts with inorganic acids (such as the nitrates, phosphates and sulphates), or organic acids (such as the acetates, propionates, maleates, fumarates, succinates, benzoates, picrates and salicylates), or with substitution derivatives of these acids.

The following examples illustrate the invention.

EXAMPLE I

A current of dry hydrogen chloride is passed for 5 hours into a vigorously stirred suspension of 1-methyl-2 - N - (2-cyanoethyl)carbamoyl-4-[1-methyl-4-nitro-2-pyrrolyl)carbonyl-amino]pyrrole (16 g.) in anhydrous ethanol (320 cc.) previously cooled to 0° C., the temperature being kept at 0° C. throughout. The nitrite slowly dissolves during the first three hours and then the iminoether hydrochloride formed begins to crystallise. When the passage of hydrogen chloride is complete the reaction mixture is allowed to stand overnight in a refrigerator. The precipitate formed is filtered off rapidly through sintered glass in a dry atmosphere, washed with diethyl ether and suspended in anhydrous ethanol (80 cc.). A solution of ammonia in ethanol (80 cc. containing about 7% of ammonia) is added to this suspension with stirring and cooling. Gaseous ammonia is then passed in for 5 hours with stirring. After standing overnight at ambient temperature, the precipitate formed, containing a little ammonium chloride which is removed with methanol, is collected, giving 1-methyl-2-N-(2-amidinoethyl)carbamoyl - 4 - [(1 - methyl - 4 - nitro - 2 - pyrrolyl)carbonylamino]pyrrole hydrochloride (16.3 g.), M.P. 324–325° C.

1 - methyl-2-N-(2-cyanoethyl)carbamoyl-4-[(1-methyl-4-nitro-2-pyrrolyl)carbonylamino]pyrrole (17 g.), (M.P. 248° C.), used as starting material is prepared by reacting, in the presence of triethylamine (6.5 g.), 1-methyl-2-chlorocarbonyl-4-nitropyrrole (11 g.) with a solution of 1 - methyl - 2 - N - (2 - cyanoethyl)carbamoyl - 4-aminopyrrole (11.2 g.) in tetrahyrofuran (300 cc.). This solution is obtained by the hydrogenation of 1-methyl-2-N-(2-cyanoethyl)carbamoyl-4-nitropyrrole (13 g.) in the presence of Raney nickel at atmospheric pressure and at a temperature below 15° C.

1 - methyl-2-N-(2-cyanoethyl)carbamoyl-4-nitropyrrole (294 g.) M.P. 135° C.) is obtained by the condensation of 1-methyl-2-chlorocarbonyl-4-nitropyrrole (276 g.) with 3-aminopropionitrile (210 g.) in toluene (2.4 l.) at a temperature below 10° C.

EXAMPLE II

Proceeding as in Example I but commencing with 1 - methyl - 2-N-(2-cyanoethyl)carbamoyl-4-acetamidopyrrole (19.6 g.), 1-methyl-2-N-(2-amidinoethyl)carbamoyl - 4 - acetamidopyrrole hydrochloride (21.2 g.), M.P. 250° C. after recrystallisation from methanol, is obtained.

1 - methyl-2-N-(2-cyanoethyl)carbamoyl-4-acetamidopyrrole (19.6 g.) (M.P. 158° C.), used as starting material, is obtained by the condensation of acetyl chloride (14.85 g.) with 1-methyl-2-N-(2-cyanoethyl)carbamoyl-4-aminopyrrole (36.3 g.) in tetrahydrofuran in the presence of triethylamine (20.2 g.).

EXAMPLE III

Proceeding as in Example I but commencing with 1 - methyl-2-N-(2-cyanoethyl)carbamoyl-4-benzyloxycarbonylaminopyrrole (10.5 g.), 1-methyl-2-N-(2-amidinoethyl)carbamoyl-4-benzyloxycarbonylaminopyrrole hydrochloride (9 g.), M.P. 213° C., is obtained after recrystallisation from ethanol (200 cc.). 1-methyl-2-N-(2-cyanoethyl) carbamoyl - 4-benzloxycarbonylaminopyrrole (13.7 g.) (M.P. 123° C.) used as starting material is obtained by the condensation of benzyl chloroformate with 1-methyl-2-N-(2-cyanoethyl)carbamoyl-4-aminopyrrole in solution in tetrahydrofuran in the presence of triethylamine.

EXAMPLE IV

Proceeding as in Example I but commencing with 1 - methyl-2-N-(2-cyanoethyl)carbamoyl-4-ureidopyrrole (20 g.), 1-methyl-2-N-(2-amidinoethyl)carbamoyl-4-ureidopyrrole hydrochloride (18 g.), M.P. about 224° C., is obtained after recrystallisation from methanol.

1 - methyl-2-N-(2-cyanoethyl)carbamoyl-4-ureidopyrrole (21.9 g.) (M.P. 188° C.) used as starting material, is obtained by the reaction of potassium cyanate with 1-methyl-2-N-(2-cyanoethyl)carbamoyl-4 - aminopyrrole in solution in tetrahydrofuran in the presence of 2 N hydrochloric acid (30 cc.).

EXAMPLE V

A current of dry hydrogen chloride is passed for 8 hours into a stirred suspension of 1-methyl-2-N-(2-cyanoethyl)-carbamoyl-4-trimethylacetamidopyrrole (10 g.) in anhydrous ethanol (100 cc.) previously cooled to 0° C., the temperature being kept below 5° C. throughout. The nitrile slowly dissolves. When the passage of hydrogen chloride is complete the reaction product is precipitated by the addition of anhydrous diethyl ether (2 litres) and left to stand for 15 hours at 4° C. The imino-ether hydrochloride formed precipitates as needles and is filtered off rapidly in a dry atmosphere, washed with anhydrous diethyl ether, and suspended in anhydrous ethanol (100 cc.). This suspension is cooled to −5° C. and a current of dry ammonia passed in for 1 hour. Stirring is continued for 5 hours while the mixture is allowed to return to ambient temperature. Solution occurs at first followed by the precipitation of a colourless solid. The suspension is introduced into diisopropylether (2 litres), left for 15 hours at 4° C. and the product collected. The product obtained is purified by dissolving in dimethylformamide, filtering off the small quantity of insoluble material and precipitating with di-isopropyl ether. Filtration and recrystallisation from isopropanol gives 1-methyl-2-N-(2-amidinoethyl)carbamoyl-4-trimethylacetamidopyrrole hydrochloride (5.6 g.), M.P. 191° C.

1-methyl - 2 - N-(2-cyanoethyl)carbamoyl-4-trimethylacetamidopyrrole (10.3 g.) (M.P. 184° C.) used as starting material is obtained by reacting pivaloyl chloride (8.8 g.) with 1-methyl - 2 - N-(2-cyanoethyl)carbamoyl-4-aminopyrrole (13.4 g.) in solution in tetrahydrofuran (270 cc.) in the presence of triethylamine (7.6 g.).

EXAMPLE VI

Proceeding as in Example V but commencing with 1-methyl-2-N-(2-cyanoethyl)carbamoyl - 4 - cyanoacetamidopyrrole (9 g.), 1-methyl-2-N-(2-amidinoethyl)carbamoyl - 4-(2-amidinoacetyl)aminopyrrole dihydrochloride (5.8 g.), M.P. 255° C., is obtained, after recrystallisation from methanol to which diethyl ether has been added.

-methyl - 2 - N-(2-cyanoethyl)carbamoyl-4-cyanoacetamidopyrrole (10 g.) (M.P. 204° C.) used as starting material, is obtained by the condensation of cyanoacetyl chloride (9 g.) with 1-methyl-2-N-(2-cyanoethyl)carbamoyl-4-aminopyrrole (16.3 g.) in tetrahydrofuran in the presence of triethylene (9 g.).

EXAMPLE VII

Proceeding as in Example V but commencing with 1-methyl-2-N-(2-cyanoethyl)carbamoyl - 4 - benzamidopyrrole (16.1 g.), hydrated 1-methyl-2-N-(2-amidinoethyl)carbamoyl - 4 - benzamidopyrrole hydrochloride (9 g.), M.P. about 180° C. is obtained.

The nitrile (16.2 g.) (M.P. 105° C.) used as starting material is obtained by the reaction of benzoyl chloride (12.2 g.) with 1-methyl-2-N-(2-cyanoethyl)carbamoyl-4-aminopyrrole (16.3 g.) in tetrahydrofuran, in the presence of triethylamine (9 g.).

EXAMPLE VIII

Proceeding as in Example V but commencing with 1-methyl-2-N-(2-cyanoethyl)carbamoyl - 4 - nicotinamidopyrrole (8.5 g.), hydrated 1-methyl-2-N-(2-amidinoethyl)-carbamoyl-4-nicotinamidopyrrole hydrochloride (4 g.), M.P. about 180° C. is obtained.

1 - methyl - 2 - N-(2-cyanoethyl)carbamoyl-4-nicotinamidopyrrole (8.7 g.) (M.P. 192° C.) used as starting material is obtained by the condensation of nicotinoyl chloride hydrochloride (17.7 g.) with 1-methyl-2-N-(2-cyanoethyl)carbamoyl-4-aminopyrrole (19.2 g.) in tetrahydrofuran and chloroform in the presence of triethylamine (21.2 g.).

EXAMPLE IX

Proceeding as in Example V but commencing with 1-methyl-2-N-(2-cyanoethyl)carbamoyl - 4 - isonicotinamidopyrrole (10.5 g.), 1-methyl-2-N-(2-amidinoethyl)carbamoyl-4-isonicotinamidopyrrole hydrochloride (8.2 g.), M.P. 242° C. is obtained.

1-methyl-2-N-(2-cyanoethyl)carbamoyl - 4 - isonicotinamidopyrrole (10.7 g.) (M.P. 210° C.) used as starting material is obtained by the condensation of isonicotinoyl chloride hydrochloride (17.7 g.) with 1-methyl-2-N-(2-cyanoethyl)carbamoyl-4-aminopyrrole (19.2 g.) in tetrahydrofuran and chloroform in the presence of triethylamine (21.2 g.).

EXAMPLE X

Proceeding as in Example V but commencing with 1-methyl-2-N-(2-cyanoethyl)carbamoyl - 4 - (5-nitro-2-furoyl)aminopyrrole (8 g.) 1-methyl-2-N-(2-amidinoethyl)-carbamoyl - 4 - (5-nitro-2-furoyl)aminopyrrole hydrochloride (4.5 g.), M.P. 265° C. (with decomposition), is obtained.

1-methyl-2-N-(2-cyanoethyl)carbamoyl - 4 - (5-nitro-2-furoyl)aminopyrrole (8 g.) (M.P. 222° C.) used as starting material is obtained by the condensation of 2-chlorocarbonyl-5-nitrofuran (15.5 g.) with 1-methyl-2-N-(2-cyanoethyl)carbamoyl - 4 - aminopyrrole (16.5 g.) in tetrahydrofuran in the presence of triethylamine (9.2 g.).

EXAMPLE XI

Proceeding as in Example V but commencing with 1-methyl-2-N-(2-cyanoethyl)carbamoyl - 4 - (4-acetamidobenzoyl)aminopyrrole (20 g.), 1-methyl-2-N-(2-amidinoethyl)carbamoyl - 4 - (4-acetamidobenzoyl)aminopyrrole hydrochloride (7 g.), M.P. 288° C., is obtained.

1-methyl-2-N-(2-cyanoethyl)carbamoyl - 4 - (4-acetamidobenzoyl)aminopyrrole (20 g.) (M.P. 224° C.) is obtained by the condensation of 1-methyl-2-N-(2-cyanoethyl)carbamoyl - 4 - aminopyrrole (21.1 g.) with 4-acetamidobenzoic acid (20 g.) previously condensed with N,N'-carbonyldiimidazole (17.8 g.) in a medium of anhydrous tetrahydrofuran.

EXAMPLE XII

Proceeding as in Example V but commencing with 1-methyl-2-N-(2-cyanoethyl)carbamoyl-4-(4 - nitrobenzoyl)aminopyrrole (24 g.), 1 - methyl-2-N-(2-amidinoethyl)carbamoyl-4-(4 - nitrobenzoyl)aminopyrrole hydrochloride (22.7 g.), M.P. about 270° C., is obtained.

1-methyl-2-N-(2-cyanoethyl)carbamoyl - 4 - (4-nitrobenzoyl)-aminopyrrole (51 g.) (M.P. 222–223° C.) is obtained by the condensation of p-nitrobenzoyl chloride (37.5 g.) with 1-methyl-2-N-(2-cyanoethyl)carbamoyl-4-aminopyrrole (38.4 g.) in tetrahydrofuran in the presence of triethylamine (21 g.).

EXAMPLE XIII

By the hydrogenation of 1-methyl-2-N-(2-amidinoethyl)carbamoyl-4-(4-nitrobenzoyl)aminopyrrole hydrochloride (11.3 g.) (prepared as described in Example XII) in the presence of previously reduced Adams' platinum oxide (1 g.) in methanol and at ordinary temperature and pressure, followed by filtration and evaporation of the solvent, 1 - methyl-2-N-(2 - amidinoethyl)carbamoyl - 4-(4 - aminobenzoyl)aminopyrrole monohydrochloride is obtained in the form of a meringue which is dissolved in water (30 cc.) and treated with a solution of sodium sulphate (7.5 g.) in water (30 cc.). The neutral sulphate of the product desired precipitates. After filtering and drying, first at 20° C. and then at 110° C. for 18 hours, 1 - methyl - 2-N-(2-amidinoethyl)carbamoyl-4-(4-aminobenzoyl)aminopyrrole neutral sulphate (8.7 g.), containing 2.6% water, M.P. about 190° C. is obtained.

EXAMPLE XIV

Guanidinoacetic acid hydrochloride (5 g.) and rectified dimethylformamide (80 cc.) are placed in a 3-necked flask fitted with a mechanical stirrer and a thermometer. This flask is placed in an oil bath previously heated to 110° C. After solution has occurred, 1-methyl-2-N-(2-amidinoethyl)carbamoyl - 4 - (4-aminobenzoyl)aminopyrrole monohydrochloride (11 g.) (prepared as described in Example XIII but further purified by treatment with ethanol, filtration, precipitation with diethyl ether, filtration and trituration with butanone, giving a product having M.P. 210–215° C.) is added and a red-brown solution obtained. The flask is then removed from the bath and dicyclohexylcarbodiimide (6.8 g.) added over 2 minutes. A slightly exothermic reaction develops and a crystalline precipitate forms. When the interior temperature has returned to 90° C., the flask is reheated for 15 minutes on an oil bath at 120° C. The temperature is allowed to fall to 20° C., cyclohexylurea (6.8 g.; M.P. 236° C.) is removed, and the filtrate is concentrated to dryness under reduced pressure with heating on a water bath. The gum obtained is dissolved in water (80 cc.) previously heated to 80° C., a small quantity of insoluble material filtered off and hydrochloric acid (36.5%; 8 cc.), followed by acetone (100 cc.), added to the filtrate. The fine precipitate formed is centrifuged, and dried, and the product (5.7 g.) is recrystallised from N hydrochloric acid (170 cc.) in the presence of animal charcoal to give, after drying, hydrated 1-methyl-2-N-(2-amidinoethyl) carbamoyl - 4 - (4-guanidinoacetylaminobenzoyl)aminopyrrole dihydrochloride (2.8 g.), M.P. 195–205° C.

EXAMPLE XV

Proceeding as in Example V but commencing with 1-methyl - 2 - N - (2-cyanoethyl)carbamoyl-4-(4-cyanoacetylaminobenzoyl)aminopyrrole (21.7 g.), hydrated 1-methyl - 2 - N - (2-aminoethyl)carbamoyl-4-(4-amidinoacetylaminobenzoyl)aminopyrrole dihydrochloride (5.2 g.), M.P. 215–255° C. is obtained. 1-methyl-2-N-(2-cyanoethyl)carbamoyl - 4 - (4-cyanoacetylaminobenzoyl) aminopyrrole (21.7 g.) (M.P. 218–220° C.) is obtained by the condensation of 1-methyl-2-N-(2-cyanoethyl)carbamoyl-4-aminopyrrole (19.2 g.) with 4-cyanoacetylaminobenzoic acid (20.4 g.), previously condensed with carbonyldiimidazole (16.2 g.), in dimethylformamide.

EXAMPLE XVI

Catalytic hydrogenation of 1-methyl-2-N-(2-amidinoethyl)carbamoyl - 4 - (1-methyl-4-nitro-2-pyrrolyl)carbonylaminopyrrole hydrochloride (9.2 g.) (M.P. 324–325° C. prepared as described in Example I) in the presence of Raney nickel in dimethylformamide (320 cc.) at ordinary temperature and pressure, gives the corresponding amine monohydrochloride (5.8 g.), M.P. about 220° C. (with decomposition). This monohydrochloride (1 g.) is purified through Amberlite CG–50 and eluted with 0.5 N hydrochloric acid, giving, by precipitation from the aqueous solutions with acetone after removal of sodium chloride, 1-methyl - 2-N-(2-amidinoethyl)carbamoyl-4-(1-methyl - 4-amino-2-pyrrolyl)carbonylaminopyrrole dihydrochloride (0.54 g.) containing water and acetone, M.P. about 200° C.

EXAMPLE XVII

Proceeding as in Example XIV but commencing with crude 1-methyl-2-N-(2-amidinoethyl)carbamoyl - 4 - (1-methyl-4-amino-2-pyrrolyl)carbonylaminopyrrole monohydrochloride (1.42 g.) (prepared as described in Example XVI), guanidinoacetic acid hydrochloride (0.59 g.) and dicyclohexylcarbodiimide (1.12 g.) in rectified dimethylformamide, with removal of cyclohexylurea, evaporation of dimethylformamide and treatment of an aqueous solution of the evaporation residue with an aqueous solution of the evaporation residue with an aqueous solution of sodium sulphate gives a crude product (0.270 g.) from which is obtained, by recrystallisation, 1-methyl - 2 - N-(2-amidinoethyl)carbamoyl-4-(1-methyl-4-guanidinoacetylamino - 2 - pyrrolyl)carbonylaminopyrrole sulphate (0.1 g.), M.P. 270–272° C.

EXAMPLE XVIII

Proceeding as in Example XII but commencing with 1-methyl - 2 - N - (2-cyanoethyl)carbamoyl-4-(2-chloro-4-nitrobenzoyl)aminopyrrole (58 g.), 1 - methyl-2-N-(2-amidinoethyl)carbamoyl - 4 - (2-chloro-4-nitrobenzoyl) aminopyrrole (45.4 g.), M.P. 224° C. which crystallises directly from ammoniacal ethanol, is obtained. Addition of diisopropylether to the filtrate gives a second crop of the same compound (17.5 g.), M.P. 224° C., but containing about 6% of ammonium chloride which may be removed by simple washing with slightly acidified water (0.3%).

1-methyl - 2 - N-(2-cyanoethyl)carbamoyl-4-(2-chloro-4-nitrobenzoyl)aminopyrrole (73.5 g.) (M.P. 200° C.) is obtained by the condensation of 2-chloro-4-nitrobenzoylchloride (50.6 g.) with 1-methyl-2-N-(2-cyanoethyl) carbamoyl-4-aminopyrrole (44.1 g.) in tetrahydrofuran in the presence of triethylamine (24.1 g.).

EXAMPLE XIX

Proceeding as in Example XIII but commencing with 1-methyl-2-N-(2 - amidinoethyl)carbamoyl-4-(2-chloro-4-nitrobenzoyl)aminopyrrole hydrochloride (21.4 g.) (prepared as described in Example XVIII) hydrated 1-methyl-2-N-(2-amidinoethyl)carbamoyl-4-(2-chloro - 4 - aminobenzoyl)aminopyrrole monohydrochloride (14.5 g.), M.P. about 180° C. is obtained after recrystallisation from a mixture of methanol (320 cc.) and di-isopropylether (220 cc.).

EXAMPLE XX

Proceeding as in Example XIV but commencing with 1-methyl-2-N-(2 - amidinoethyl)carbamoyl-4-(2-chloro-4-aminobenzoyl)aminopyrrole monohydrochloride (9.5 g.) (prepared as described in Example XIX), guanidinoacetic acid hydrochloride (3.64 g.) and dicyclohexylcarbodiimide (5.9 g.) in rectified dimethylformamide (38 cc.), and after treatment identical with that of Example XIV, a crude product (6.4 g.) is obtained which, after recrystallisation from N hydrochloric acid (35 cc.), gives 1-methyl-2-N-(2-amidinoethyl)carbamoyl-4-(2-chloro-4-guanidinoacetylaminobenzoyl)aminopyrrole dihydrochloride (5.4 g.), M.P. about 210° C.

EXAMPLE XXI

Sodium bicarbonate (4.2 g.) is added to a solution of 1-methyl-2-N-(2-amidinoethyl)carbamoyl-4-aminopyrrole hydrochloride (12.2 g.) in water (200 cc.). A solution of 2-chlorocarbonyl-1-methyl-4-nitropyrrole (9.4 g.) in diethyl ether (200 cc.) is then added with vigorous stirring, the temperature being kept below 20° C. A brisk evolution of gas occurs which lasts for about 15 minutes while a yellow precipitate forms. Stirring is continued for 2 hours and the precipitate formed is collected, washed with water (3 × 20 cc.) and diethyl ether (3 × 20 cc.) and dried, giving 1-methyl-2-N-(2-amidinoethyl)carbamoyl-4-(1 - methyl-4-nitro-2-pyrroylyl)carbonylaminopyrrole hydrochloride (12.6 g.), identical with the product described in Example I.

This product (5. g.) is purified by dissolving in dimethylformamide (1 litre) at 20° C., followed by precipitation with di-isopropylether (3 litres) at 80° C. giving a product (4.6 g.), M.P. 328° C.

1 - methyl-2-N-(2-amidinoethyl)carbamoyl-4-aminopyrrole hydrochloride (M.P. 225° C.) used as starting material, is obtained by catalytic hydrogenation using Adams' platinum (1 g.) in ethanol (400 cc.), and at ordinary temperature and pressure, of 1-methyl-2-N-(2-amidinoethyl)carbamoyl-4-nitropyrrole hydrochloride (13.8 g.) (M.P. 281° C.). The latter compound (20 g.) is obtained from 1 - methyl-2-N-(2-cyanoethyl)carbamoyl-4-nitropyrrole (16.7 g.) through the iminoether hydrochloride.

EXAMPLE XXII

A current of dry hydrogen chloride is passed, with stirring, for 4 hours, the temperature being kept below 0° C. into a suspension of 1-methyl-2-N-(3-cyanopropyl)carbamoyl - 4 - (4 - cyanoacetylaminobenzoyl)aminopyrrole (12.2 g.) in anhydrous ethanol (125 cc.) previously cooled to −5° C. When the passage of gas is complete the mixture is allowed to stand for 15 hours at 4° C. A yellow solution is obtained to which is added anhydrous diethyl ether (2 litres). The bis-iminoether dihydrochloride formed separates as a gum, which is separated by decanting and is then washed vigorously by stirring and decanting in a dry atmosphere with anhydrous diethyl ether (3 × 200 cc.). The gum obtained is treated with 7% anhydrous ethanolic ammonia solution (150 cc.) with stirring until solution occurs. A slight precipitate (about 100 mg.) forms which is filtered off and the clear solution obtained allowed to stand at laboratory temperature. Crystallisation slowly occurs and, after standing for 7 hours, 1-methyl-2-N-(3-amadinopropyl)carbamoyl-4-(4-amidinoacetyl - aminobenzoyl)aminopyrrole dihydrochloride is collected and purified by dissolving in boiling methanol (800 cc.), treating with animal charcoal, filtering and adding di-isopropylether (800 cc.). The pure dihydrochloride, solvated with one molecule of water and half a molecule of methanol, crystallises slowly on cooling. Filtering and drying gives a product (11.4 g.), M.P. about 200° C.

1-methyl-2-N-(3-cyanopropyl)carbamoyl-4-(4 - cyanoacetyl-aminobenzoyl)aminopyrrole (14.1 g.) (M.P. 250–251° C.) used as starting material is obtained by reacting 1 - methyl-2-N-(3-cyanopropyl)carbamoyl-4-aminopyrrole (10.3 g.) in dimethylformamide (50 cc.) with 4-cyanoacetylaminobenzoic acid (10.8 g.) previously condensed with N,N′-carbonyldiimidazole (10 g.) in anhydrous dimethylformamide (100 cc.). The solution of 1-methyl-2-N-(3-cyanopropyl)carbamoyl-4-aminopyrrole (10.3 g.) in dimethylformamide is obtained by the catalytic hydrogenation of 1 - methyl-2-N-(3 - cyanopropyl)-4-nitropyrrole (11.8 g.) in a mixture of dimethylformamide (50 cc.) and ethanol (40 cc.) in the presence of palladium on calcium carbonate (3 g., containing 10% of palladium) at laboratory temperature and at a pressure of 100 kg./cm.$^2$.

1-methyl-2-N-(3-cyanopropyl)carbamoyl-4-nitropyrrole (39.5 g.) (M.P. 163° C.) is obtained by reacting 4-aminobutyronitrile (19.6 g.) with 1-methyl-2-chlorocarbonyl-4-nitropyrrole (41.8 g.) in anhydrous toluene in the presence of triethylamine (26 g.).

EXAMPLE XXIII

A solution of potassium cyanate (1.6 g.) in water (20 cc.) is added to a solution of 1-methyl-2-N-(2-amidinoethyl) - carbamoyl - 4 -(1 - methyl - 4 - amino-2-pyrrolyl-carbonyl)aminopyrrole dihydrochloride (7 g.) in water (25 cc.) previously cooled to 3° C. After standing at ambient temperature for 1 hour, crystallisation commences. Stirring is continued for a further hour and the precipitate then collected and triturated with methanol (30 cc. followed by 3 × 20 cc.). Purification is completed by dissolving in a boiling mixture of methanol (90 cc.) and water (30 cc.) and treating with animal charcoal. Filtering, adding boiling acetone (150 cc.) and cooling, gives 1-methyl-2-N-(2-amidinoethyl)carbamoyl - 4 - (1 - methyl - 4 - ureido - 2 - pyrrolyl - carbonyl)aminopyrrole hydrochloride in the form of the monohydrate (4.6 g.), M.P. about 270° C. (with decomposition).

EXAMPLE XXIV

Proceeding as in Example XXII, but commencing with 1 - methyl - 2 - N - (2 - cyanoethyl)carbamoyl - 4 - picolinoylaminopyrrole (8.2 g.), hydrated 1-methyl-2-N-(2-amidinoethyl)carbamoyl - 4 - picolinoylaminopyrrole hydrochloride (5.6 g.), M.P. 160–230° C. (indistinct), is obtained.

1 - methyl - 2 - N - (2 - cyanoethyl)carbamoyl - 4 - picolinoylaminopyrrole (8.2 g.) (M.P. 138° C.) used as starting material is obtained by reacting picolinic acid (12.3 g.) previously condensed with N,N'-carbonyldiimidazole (16.3 g.) with 1-methyl-2-N-(2-cyanoethyl)carbamoyl-4-aminopyrrole (19.2 g.) in a 1:1 mixture of tetrahydrofuran and dimethylformamide.

EXAMPLE XXV

Proceeding as in Example XXII but commencing with 1 - methyl - 2 - N - (2 - cyanoethyl)carbamoyl - 4 - (4-cyanobenzoyl)aminopyrrole (20 g.) and extending the duration of the preparation of the bis-iminoether dihydrochloride to about 3 days and that of the bis-amidine to 2 days, 1-methyl-2-N-(2-amidinoethyl)carbamoyl-4-(4 - amidinobenzoyl)aminopyrrole dihydrochloride solvated with water and ethanol (9.7 g.), M.P. about 240° C., is obtained after recrystallisation.

1 - methyl - 2 - N - (2 - cyanoethyl)carbamoyl - 4 - (4-cyanobenzoyl)aminopyrrole (21.2 g.) (M.P. 195° C.) used as starting material, is obtained by the condensation of 4-cyanobenzoyl chloride (20 g.) with 1-methyl-2-N-(2-cyanoethyl)carbamoyl-4-aminopyrrole (19 g.) in benzene (350 cc.) in the presence of triethylamine (12.5 g.).

EXAMPLE XXVI

Proceeding as in Example XXII but commencing with 1 - n - butyl - 2 - N - (2 - cyanomethyl)carbamoyl - 4 - (4-cyanoacetylaminobenzoyl)aminopyrrole (15.5 g.) and after purification in a mixture of isopropanol (160 cc.) and di-isopropyl ether (160 cc.) there is obtained 1-n-butyl - 2 - N - (2 - amidinoethyl)carbamoyl - 4 - (4-amidinoacetylaminobenzoyl)aminopyrrole dihydrochloride solvated with water, isopropanol and di-isopropyl-ether (11.2 g.), M.P. (indistinct) from 160° C.

1 - n - butyl - 2 - N - (2 - cyanoethyl)carbamoyl - 4 - (4-cyanoacetylaminobenzoyl)aminopyrrole (15.8 g.) (M.P. 220° C.) used as starting material is obtained by reacting 1 - n - butyl - 2 - N - (2 - cyanoethyl)carbamoyl-4-aminopyrrole (9.36 g.) with 4-cyanoacetylaminobenzoic acid (9.25 g.), previously condensed with N,N'-carbonyldiimidazole (8.4 g.), in dimethylformamide. 1 - n - butyl - 2 - N - (2 - cyanoethyl)carbamoyl - 4 - aminopyrrole is itself obtained by the catalytic hydrogenation, at laboratory temperature and under a pressure of 100 kg./cm.$^2$, in the presence of palladium on calcium carbonate in a mixture of ethanol (43 cc.) and dimethylformamide (45 cc.), of 1-n-butyl-2-N-(2-cyanoethyl)carbamoyl-4-nitropyrrole (11 g.), (M.P. 112° C.). The latter compound (27.5 g.) is obtained by the reaction of n-butyl iodide (33 g.) with 2-N-(2-cyanoethyl)carbamoyl-4-nitropyrrole (25 g.), previously converted into the sodio derivative with sodium ethoxide, in dimethylformamide. 2 - N - (2 - cyanoethyl)carbamoyl - 4 - nitropyrrole (57 g.) (M.P. 269° C.) is obtained from 3-aminopropionitrile (42 g.) and 2-chlorocarbonyl-4-nitropyrrole (52 g.) (M.P. 150° C.), itself prepared by reaction of thionyl chloride with 4-nitro-2-pyrrolylcarboxylic acid.

EXAMPLE XXVI

Proceeding as in Example XXII, but commencing with 1 - methyl - 2 - N - (cyanomethyl)carbamoyl - 4 - (4-cyanoacetylaminobenzoyl)aminopyrrole (13.6 g.), and after purification in a mixture of ethanol (400 cc.) and diisopropyl ether (500 cc.) hydrated 1-methyl-2-N-(amidinomethyl)carbamoyl - 4 - (4 - amidinoacetylaminobenzoyl)aminopyrrole dihydrochloride (7 g.), M.P. about 215–225° C., is obtained. 1-methyl-2-N-(cyanomethyl)carbamoyl - 4 - (4 - cyanoacetylaminobenzoyl)aminopyrrole (15.8 g.) (M.P. 145–150° C.) used as starting material is obtained by reacting 1-methyl-2-N-(cyanomethyl)carbamoyl - 4 - aminopyrrole (10.7 g.) with 4-cyanoacetylaminobenzoic acid (13.4 g.), previously condensed with N,N'-carbonyldiimidazole (12.8 g.), in dimethylformamide.

1 - methyl - 2 - N - (cyanomethyl)carbamoyl - 4 - aminopyrrole is used in a crude state from its formation by the catalytic hydrogenation, in the presence of palladium on calcium carbonate under a pressure of 100 kg./cm.$^2$, of 1-methyl-2-N-(cyanomethyl)carbamoyl-4-nitropyrrole (12.5 g.) (M.P. 184° C.), in a mixture of dimethylformamide (75 cc.) and ethanol (25 cc.). 1 - methyl - 2 - N - (cyanomethyl)carbamoyl - 4 - nitropyrrole (23 g.) is obtained by the condensation of aminoacetonitrile sulphate (23 g.), in the presence of triethylamine (70 cc.) in chloroform (120 cc.), with 1-methyl-2-chlorocarbonyl-4-nitropyrrole (26.7 g.) in chloroform (100 cc.).

EXAMPLE XXVIII

A current of dry gaseous hydrogen chloride is passed for 4 hours into a suspension of 1-methyl-2-N-(2-cyanoethyl)-carbamoyl - 4 - (4 - formylaminobenzoyl)aminopyrrole (12.8 g.) in a mixture of anhydrous chloroform (200 cc.) and absolute ethanol (1.75 g.) previously cooled to 0° C., the temperature of the medium being kept below 5° C. A gummy product forms adhering to the walls of the flask. The chloroform is rapidly decanted and the gum solidified by treatment with diethyl ether (300 cc. and 2× 200 cc.). After decanting, the brown powdery solid obtained is treated with an 8.5% solution of ammonia in absolute ethanol (350 cc.) with vigorous stirring and allowed to stand for 15 hours at ambient temperature. The precipitate thus obtained is collected, washed carefully with methanol (4× 25 cc.) at ambient temperature and then purified by dissolving in boiling water (100 cc.), treating with animal charcoal and precipitating with acetone (1 litre), giving 1-methyl-2-N-(2-amidinoethyl) - carbamoyl - 4 -(4 - formylaminobenzoyl) - aminopyrrole hydrochloride (5.7 g.), M.P. 294° C.

1-methyl-2 - N-(2-cyanoethyl)carbamoyl-4-(4 - formylaminobenzoyl)aminopyrrole (29.2 g.) (M.P. 238° C.), used as starting material, is obtained by reacting 1-methyl-2-N -(2 - cyanoethyl)carbamoyl - 4 - aminopyrrole (19.2 g.) with 4-formylaminobenzoic acid (16.6 g.), previously condensed with N,N'-carbonyldiimidazole (20.2 g.), in dimethylformamide.

EXAMPLE XXIX

A mixture of 1-methyl-2-N-(2-amidinoethyl)carbamoyl-4-(1-methyl-4 - amino-2 - pyrrolylcarbonyl)aminopyrrole dihydrochloride (6.9 g.) and cyanamide (1.6 g.) in absolute ethanol (100 cc.) is boiled for 3 days. After cooling, the precipitate is collected and purified by dissolving in boiling 14.5% hydrochloric acid, adding acetone (600 cc.) and cooling, giving, after filtering and drying, hydrated 1-methyl-2-N-(2-amidinoethyl)carbamoyl-4-(1-methyl-4 - guanidino-2 - pyrrolylcarbonyl)aminopyrrole hydrochloride (4.5 g.), M.P. 329–330° C.

EXAMPLE XXX

Proceeding as in Example XXII, but commencing with 1-methyl-2-N-(2-cyanoethyl)carbamoyl-4 - [4 - (3 - guanidinopropionylamino)benzoyl]aminopyrrole hydrochloride (4.7 g.), crude 1-methyl-2-N-(2-amidinoethyl)carbamoyl - 4-[4 - (3 - guanidinopropionylamino)benzoyl]aminopyrrole dihydrochloride (4 g.) is obtained which is purified by double decomposition in distilled water (10 cc.) with pure sodium sulphate (1.1 g.), giving hydrated 1-methyl-2-N-(2-amidinoethyl)carbamoyl - 4-[4-(3-guanidinopropionylamino)benzoyl]aminopyrrole sulphate (2.3 g.), M.P. about 280° C.

1-methyl-2-N-(2-cyanoethyl)carbamoyl-4-[4-(3 - guanidinopropionylamino)benzoyl]aminopyrrole hydrochloride (6 g.) (M.P. about 170° C.) used as starting material is obtained by heating to boiling over 8 hours, a solution in water (25 cc.) and methanol (25 cc.) of S-methylisothiouronium hydrochloride (1.46 g.) and 1-methyl-2-N- (2 - cyanoethyl)carbamoyl-4 - [4-(3 - aminopropionylamino)benzoyl]aminopyrrole (M.P. 212° C.) (9 g.).

The latter compound (18.9 g.) is obtained by the removal of the benzyloxycarbonyl group, by hydrogenation in the presence of palladium on charcoal in dimethylformamide at ordinary temperature and pressure, of 1-methyl-2-N- (2-cyanoethyl)carbamoyl - 4-[4 - (3 - benzyloxycarbonylaminopropionylamino)benzoyl]aminopyrrole (M.P. 244° C.) (37 g.).

The latter compound (37.7 g.) is obtained by condensing 3-benzyloxycarbonylaminopropionic acid (17.9 g.), previously condensed with N,N'-carbonyldiimidazole (16.2 g.) in dimethylformamide with 1-methyl-2-N-(2-cyanoethyl)carbamoyl-4-(4 - aminobenzoyl)aminopyrrole (M.P. 205° C.) (24.9 g.).

The latter compound (27.7 g.) is obtained by the catalytic hydrogenation of 1-methyl-2-N-(2-cyanoethyl)-carbamoyl-4-(4-nitrobenzoyl)aminopyrrole (34.2 g.) in dimethylformamide (350 cc.) and ethanol (50 cc.) in the presence of palladium deposited on calcium carbonate at a pressure of 100 kg./cm.$^2$ and ordinary temperature.

EXAMPLE XXXI

Proceeding as in Example XXII, but commencing with 1-methyl-2-N-(2-cyanoethyl)carbamoyl-4-(1 - methyl - 5-nitro - 2 - pyrrolylcarbonyl)aminopyrrole (15.2 g.), 1-methyl-2-N-(2 - amidinoethyl)carbamoyl - 4 - (1 - methyl-5-nitro-2 - pyrrolylcarbonyl)aminopyrrole hydrochloride, (M.P. 305° C.) (16.1 g.), is obtained.

1-methyl-2-N-(2 - cyanoethyl)carbamoyl - 4 - (1-methyl-5-nitro-2-pyrrolylcarbonyl)aminopyrrole (M.P. 202° C.) (15.5 g.) is obtained by the reaction of 1-methyl-2-N-(2-cyanoethyl)carbamoyl-4-aminopyrrole (12.5 g.) with crude 1-methyl-2 - chlorocarbonyl - 5 - nitropyrrole (12.8 g.) in tetrahydrofuran (400 cc.) in the presence of triethylamine (7.1 g.).

Crude 1-methyl-2-chlorocarbonyl-5-nitropyrrole (83 g.) (M.P. 32° C.), used as starting material, is obtained by heating a suspension of 1-methyl-5-nitro-2-pyrrolylcarboxylic acid (M.P. 205° C.) (75.8 g.) in thionyl chloride (300 cc.) under reflux for 1 hour. 1-methyl-5-nitro-2-pyrrolylcarboxylic acid (102 g.) is obtained by treating 1-methyl-2-ethoxycarbonyl-5-nitropyrrole (M.P. 37° C.) (120 g.) with a solution of sodium hydroxide (25.2 g.) in a mixture of water (240 cc.) and ethanol (240 cc.) at laboratory temperature. 1-methyl-2-ethoxycarbonyl-5-nitropyrrole (120 g.) is obtained by the hydrolysis, in water (1.4 litre) at 25° C. for 12 hours, of ethyl 1-methyl-5-nitro - 2 - pyrrolylcarboximidate hydrochloride (144 g.). The latter compound (240 g.) is prepared by reaction of gaseous hydrogen chloride with a suspension of 1-methyl-2-cyano-5-nitropyrrole (200 g.) [M.P. 88° C. prepared according to H. J. Anderson, Can. J. Chem. 37, 2053 (1959)] in anhydrous ethanol (2 litres).

EXAMPLE XXXII

Proceeding as in Example XXII, but commencing with 1 - methyl - 2-N-(2-cyanoethyl)carbamoyl-4-[4-(4-guanidinobutyrylamino)benzoyl] aminopyrrole hydrochloride (6.6 g.), 1-methyl-2-N-(2-amidinoethyl(carbamoyl-4-[4-(4-guanidinobutyrylamino) - benzoyl]aminopyrrole dihydrochloride (6.6 g.) is obtained, which is purified by dissolving in distilled water (50 cc.) at 35° C., cooling and adding concentrated hydrochloric acid (10 cc.), giving a product (4.5 g.), M.P. about 220° C.

1-methyl-2-N-(2-cyanoethyl)carbamoyl - 4 - [4 - (4-guanidinobutyrylamino)benzoyl]aminopyrrole hydrochloride (8.2 g.) (M.P. indistinct about 190–220° C.), used as starting material, is obtained in a similar manner to the corresponding 3-guanidinoprionyl compound of Example XXX, but commencing with 1-methyl-2-N-(2-cyanoethyl)carbamoyl - 4 - [4-(4-aminobutyrylamino)benzoyl] aminopyrrole (9.2 g.) (M.P. indistinct—about 180–186° C.).

The latter compound (10.9 g.) is obtained as in Example XXX, but commencing with 1-methyl-2-N-(2-cyanoethyl)carbamoyl-4 - [4 - (4-benzyloxycarbonylaminobutyrylamino)benzoyl]aminopyrrole (18.5 g.) (1st M.P. 190° C., 2nd M.P. 203° C.).

The latter compound is obtained by the reaction of 1-methyl-2-N-(2-cyanoethyl)carbamoyl - 4-(4 - aminobenzoyl)-aminopyrrole (17.1 g.) with 4-benzyloxycarbonylaminobutyric acid (13 g.), previously condensed with N,N'-carbonyldiimidazole (11.1 g.), in dimethylformamide (200 cc.).

4-benzyloxycarbonylaminobutyric acid (45.4 g.) (M.P. 64–65° C.) is obtained by reacting benzyl chloroformate (68 g.) with 4-aminobutyric acid (31 g.) in solution in 1.6% sodium hydroxide solution (165 cc.).

The present invention includes within its scope pharmaceutical and veterinary compositions which comprise at least one of the compounds of general Formula I, or non-toxic acid addition salt thereof, in association with a pharmaceutical or veterinary carrier or coating. In practice the compounds of the invention will normally be administered parenterally.

Preparations according to the invention for parenteral administration, include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Solid compositions for oral administration include compressed tablets, pills, powders, and granules. In such solid compositions one or more of the active compounds is, or are, admixed with at least one inert diluent such as starch, sucrose or lactose. The compositions may also comprise, as is normal practice, additional substances other than inert diluents, e.g., lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

Compositions for rectal administration are suppositories which may contain, in addition to the active substance, excipients such as cocoa butter or a suitable wax base.

The percentage of active ingredient in the compositions of the invention may be varied, it being necessary that it should constitute a proportion such that a suitable dosage shall be obtained. The dosage will depend upon the therapeutic effect sought, the route of administration, the length of treatment, and the species of animal. The dosages are generally from 3 to 7 mg. per kg. of animal weight, administered preferably subcutaneously or intramuscularly, when used as trypanocide in cattle.

I claim:
1. An amidine of the formula:

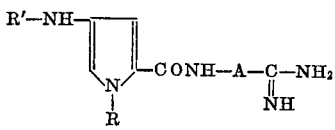

and its acid addition salts, wherein A represents a straight or branched alkylene group containing up to 5 carbon atoms, R represents a lower alkyl group, and R' represents carbamoyl, mono(lower alkyl) carbamoyl, di(lower alkyl)carbamoyl, unsubstituted lower aliphatic carboxylic acyl, such a group substituted by an amidino group, benzoyloxycarbonyl, benzoyl, nicotinoyl, isonicotinoyl, picolinoyl, or a group of formula: Z—X—CO— where X is

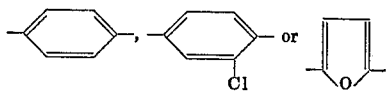

and Z is nitro, amino formamido, acetamido, ureido, amidino, guanidino, amidinoacetamido, guanidinoacetamido, 3-guanidinopropionamido, or 4-guanidinobutyramido.

2. A compound of the formula

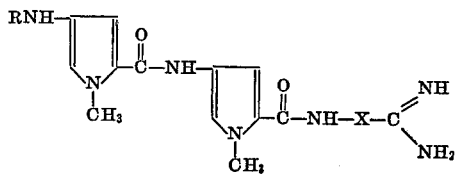

wherein R is a member selected from the group consisting of H— and

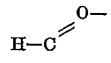

and X is a member selected from the group consisting of —$(CH_2)_n$—, wherein $n$ is 1, 3, 4, or 5.

3. An amidine as claimed in claim 1 in which A is of formula —$(CH_2)_n$—, where $n$ is 1 to 3.

4. An amidine as claimed in claim 1 in which A is ethylene, R is methyl, and R' is a group of formula: Z—X—CO— where X is p-phenylene and Z is amidinoacetamido.

5. An amidine as claimed in claim 1 in which A is ethylene, R is methyl, and R' is a group of formula: Z—X—CO— where X is p-phenylene and Z is guanidinoacetamido.

References Cited

UNITED STATES PATENTS 2,575,991  3/1949  Baltzly et al. _____ 260—564
2,613,225  6/1951  Miescher et al. _____ 260—564

NICHOLAS S. RIZZO, *Primary Examiner.*

J. A. NARCAVAGE, *Assistant Examiner.*

U.S. Cl. X.R

260—295, 295.5; 167—065